Nov. 17, 1970 JIRO SAITO 3,541,580

APPARATUS HAVING A SCANNING DEVICE ON A SLOPED PLANE

Filed Nov. 5, 1968 2 Sheets-Sheet 1

JIRO SAITO - Inventor

BY Hall, Pollock & Vande Sande

ATTORNEY

Nov. 17, 1970 JIRO SAITO 3,541,580

APPARATUS HAVING A SCANNING DEVICE ON A SLOPED PLANE

Filed Nov. 5, 1968 2 Sheets-Sheet 2

JIRO SAITO INVENTOR

BY Hall, Pollock & Vande Sande

ATTORNEY 3,541,580

APPARATUS HAVING A SCANNING DEVICE ON A SLOPED PLANE

Jiro Saito, Kawasaki-shi, Japan, assignor to Toho Denki Co. Ltd., Tokyo, Japan, a corporation of Japan
Filed Nov. 5, 1968, Ser. No. 773,378
Claims priority, application Japan, Nov. 11, 1967, 42/94,888
Int. Cl. G01d *15/24*
U.S. Cl. 346—134 3 Claims

ABSTRACT OF THE DISCLOSURE

In a facsimile receiving system, a scanning device mounted on a sloped plane, in which a sub-scanning unit constructed like a camera-back (trade name used by the International Polaroid Corp.) is moved in the scanning upwards along the sloped plane and then, upon the completion of the sub-scanning, said sub-scanning unit is automatically caused to slide down by the gravitational force along the sloped plane to the initial starting position.

BACKGROUND OF THE INVENTION

Field of the invention

This invention relates to a scanning device mounted on a sloped plane, particularly to an automatic return sub-scanning device mounted on a sloped plane as applied to facsimile receiving apparatus and the like.

Description of the prior art

In a conventional drum-scanning-type facsimile receiver, the main scanning is performed by rotating the drum while sub-scanning is performed by moving the drum or sub-scanning unit in parallel with the drum axis, said sub-scanning unit having a light source (for example, a glow tube) modulated by the picture signal and an optical system, and the light-sensitive paper being attached around said rotatable drum. In any scanning device, the sub-scanning unit must be returned to the initial starting position at the end of each sub-scanning. In the conventional device mentioned above, this return of the sub-scanning unit to the initial position is performed, for example, by quickly rotating in the reverse direction, using an auxiliary motor the feed screw on which the sub-scanning unit is carried through a half nut engaging with the feed screw, or by pulling the unit back to the initial position by means of a spring, or by other complicated means. Such devices are invariably complicated mechanically as well as electrically and accordingly require troublesome adjustments and maintenance. Moreover, the conventional returning devices are comparatively high in cost.

SUMMARY OF THE INVENTION

An object of this invention is to provide an apparatus including a scanning device mounted on a sloped plane, said scanning device comprising a sub-scanning unit, means for moving said sub-scanning unit upwards along said sloped plane during sub-scanning operation, and means for releasing said sub-scanning unit from said moving means at the end of a sub-scanning excursion, thereby allowing said unit to return to the initial position by the gravitational force.

Another object of this invention is to provide a scanning device as mentioned above, which further comprises means for damping the speed of said sub-scanning unit returning to the initial position.

A further object of this invention is to provide a scanning device as mentioned above, which further comprises means for automatically resetting said device at the end of each scanning operation so that said device is ready for the next scanning operation.

The scanning device of this invention is simpler electrically as well as mechanically than the conventional device, easier in fabrication, adjustment and maintenance, and lower in cost.

DESCRIPTION OF THE PREFERRED EMBODIMENT

In this embodiment of the present invention, the main scanning is effected by means of a solid scanning head of a circle-to-line converter utilizing juxtaposed optical fibres; according to which, one end of the group of optical fibres formed into a linear array is positioned along the path of the main scanning and the other end arranged in a circle is scanned through a rotating optical means with a light whose intensity is modulated according to the picture signal transmitted from the sending end. The scanning is effected by moving the sensitive paper in a direction perpendicular to the path of the main scanning.

Figure 1:
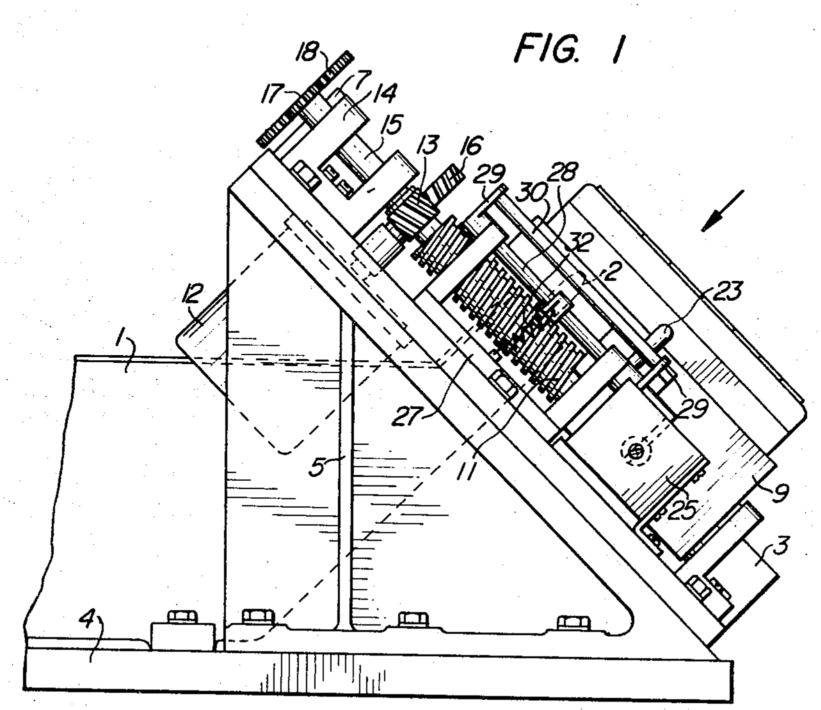
FIG. 1 is a side view of an embodiment of the scanning device of this invention.
Figure 2:
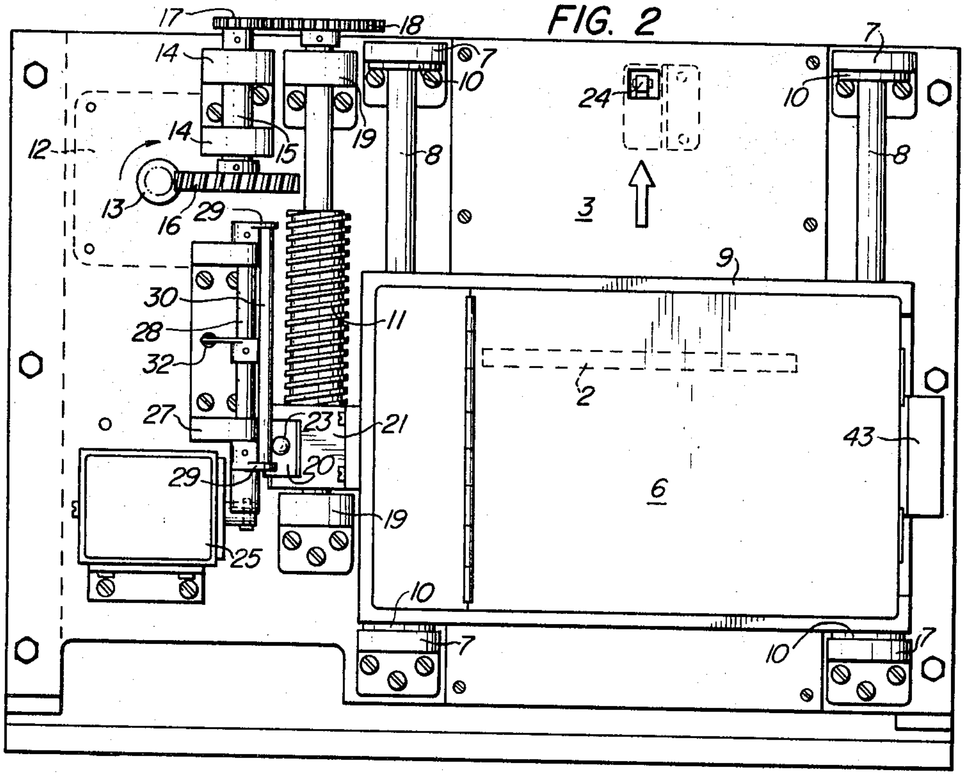
FIG. 2 shows the same device shown in FIG. 1, as viewed in the direction indicated by the arrow in FIG. 1.
Figures 3, 4, 5:
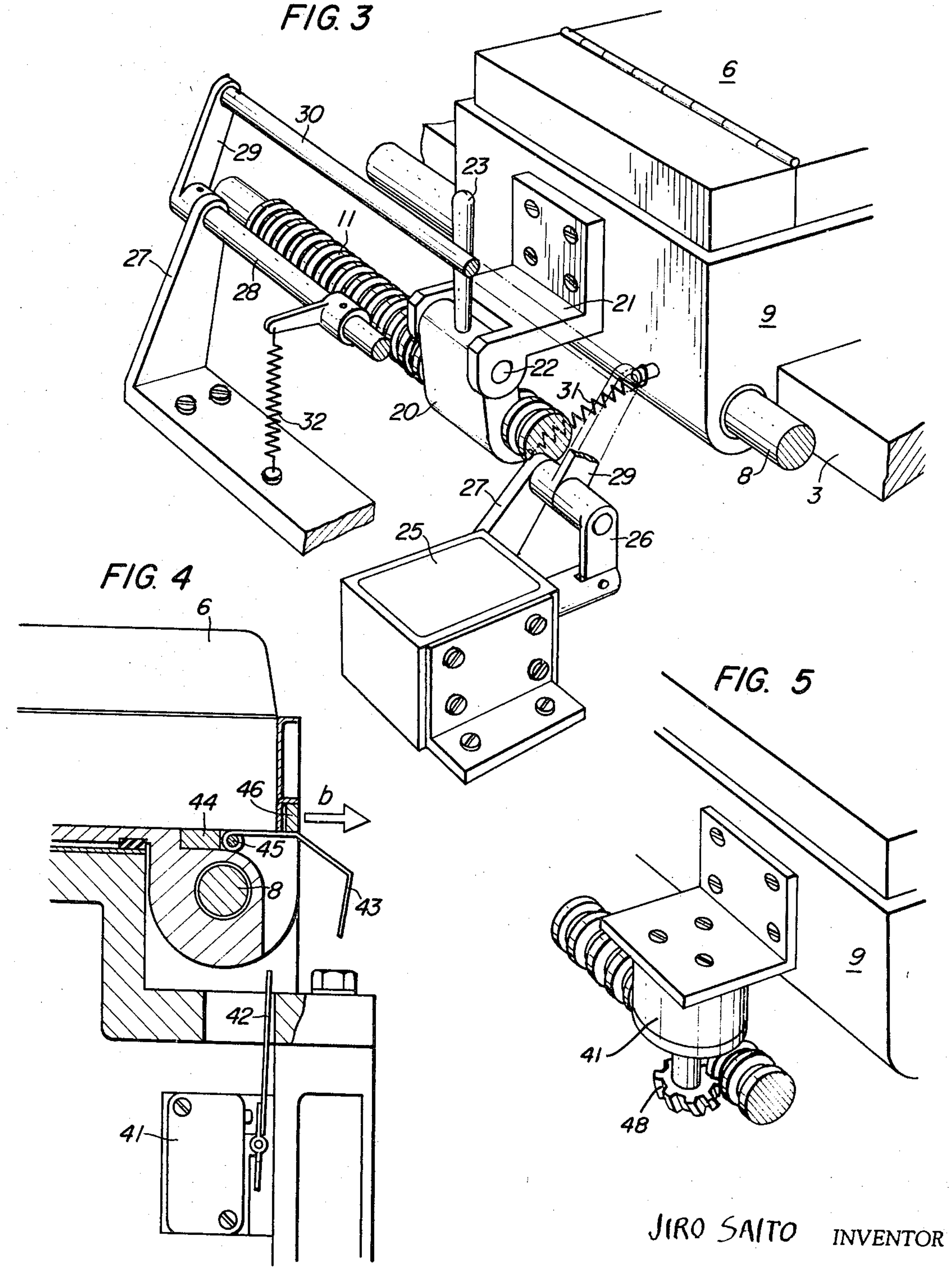
FIG. 3 shows a part of the same device, particularly illustrating the mechanism for moving the sub-scanning unit in the scanning operation and the mechanism for damping the speed of said unit in the returning excursion.
FIG. 4 shows, partly in section, a portion of the same device, from which the light sensitive paper contained in the camera-back is taken out.
FIG. 5 shows a part of another embodiment of this invention.

Referring to FIGS. 1 to 3, reference numeral 1 indicates a part of a housing containing the above-mentioned circle-to-line converter, and numeral 2 the above-mentioned solid scanning head of the linearly arranged ends fixed to and across the sloped plane 3. Said sloped plane 3 is supported on a bed 4 at an angle of approximately 30–45° by means of a bracket 5. The sub-scanning unit 6, for example, comprises a camera-back which is a case containing a recording material such as a recording film or paper and which is mounted on a carriage 9 adapted for travel upwardly and downwardly along said sloped plane 3 along guide rods 8 which are secured to brackets 7; and during sub-scanning operation said sub-scanning unit 6 moves upwards, that is, in the direction indicated by the arrow *a* in FIG. 2. Buffers 10 absorb shocks imparted to the sub-scanning unit 6 at the end of the sub-scanning excursion as well as the return excursion. A feed screw 11 which propels the carriage 9 along with the sub-scanning unit 6 upwards during scanning operation, is rotatably supported by a pair of brackets 19 and is driven by an electric motor 12 through a train of gears. That is, rotation of the motor 12 is transmitted, through a worm 13 and a worm wheel 16, to a shaft 15 rotatably supported by a pair of brackets 14, thus the speed of rotation being greatly reduced. The rotation of said shaft 15 is transmitted to the feed screw 11 by means of gears 17 and 18 respectively fitted to said shafts 15 and said screw 11.

A half-nut 20 is rotatably supported by a rod 22 fixed to a bracket 21 secured to the carriage 9. Normally or during the scanning excursion, the half-nut 20 is urged to the threaded shaft 11 by means of a spring 31 so as to make a threaded engagement with said shaft 11, thus the rotation of said shaft 11 causing said half-nut 20 to travel along said screw 11 together with the carriage 9. However, the engagement of the half-nut 20 with the feed screw 11 can be released by turning a lever 23 fixed to said half-nut 20 toward the carriage 9. Then, said carriage 9 can move freely along the guide rods 8.

In the operation, the sub-scanning unit 6 is moved upwards along the sloped plane 3 effecting sub-scanning. When said unit 6 reaches the end of the scanning excursion, a micro-switch 24 is actuated by the front of the carriage 9. This causes a plunger solenoid 25 to pull a lever 26 which in turn rotates a crank shaft 28 supported by a pair of brackets 27 and accordingly a pair of crank arms 29 fixed to said crank shaft 28. Therefore, a crank top rod 30 supported by said crank arms 29 turns toward the carriage 9, thus pushing the said lever 23 to disengage the half-nut 20 from the feed screw 11. Consequently, the carriage 9 and the sub-scanning unit 6 slide down, owing to the gravitationa force, to the initial position. During this return motion, the crank top rod 30 is adapted to keep contact with the lever 23 with an appropriate pressure to damp the speed of the sub-scanning unit assembly by the friction between said rod 30 and lever 23 and thereby to reduce the mechanical shock to the sub-scanning unit 6. Upon the return of said unit 6 to the initial position and the de-energizing of the solenoid 25, the half-nut 20 is again engaged with the feed screw 11 by the force of the spring 32.

Referring to FIG. 4 which particularly shows the portion of the camera-back 6 from which the light sensitive paper is taken out after the completion of a recording, reference numeral 41 indicates a micro-switch having an actuator 42, numeral 43 is an arm for actuating said microswitch 41 with arm 43 being attached to a fixed bar 44 by means of a hinge 45, and 46 the outlet from which the recorded sensitive paper is taken out in the direction indicated by the arrow *b*. In order to take out the sensitive paper through said outlet 46, the arm 43 must be pushed down. This movement of the arm 43 actuates the micro-switch 41 through an actuator 42 which produce a signal for resetting the facsimile receiver for the next operation.

In the above embodiment, the motion of the sub-scanning unit is effected by the engagement of the half-nut with the feed screw. However, this invention is not limited to the above embodiment. In an alternative embodiment, an electromagnetic clutch may be used instead of the half-nut, as shown in FIG. 5. In FIG. 5, the engagement and disengagement between an electromagnetic clutch 47 secured to the sub-scanning unit and the shaft of a small worm wheel 48, which is always engaged with the said feed screw, is operated by an electromagnetic device contained in the casing of the clutch 47. In this case, the crank mechanism used in the first embodiment becomes unnecessary.

In order to apply the brake to the sub-scanning unit in the returning motion thereof, the electro-magnetic clutch is momentarily energized to brake the sub-scanning unit immediately before the sub-scanning unit reaches the initial starting position. This embodiment provides a more simplified structure as it dispenses with the crank mechanism.

I claim:

1. In combination:
a scanning device mounted on a sloped plane,
said scanning device including a sub-scanning unit containing a recording material,
mounting means for said sub-scanning unit to permit movement thereof upwardly and downwardly along said sloped plane,
operating means effective during a sub-scanning operation for moving said unit upwardly over said sloped plane, said operating means permitting said unit to return automatically by gravity to a starting position upon the completion of each sub-scanning operation,
and means for applying a braking force to said unit while it is moving by gravity downwardly along said sloped plane.

2. The combination of claim 1 which further includes:
a feed screw which is rotatable during said sub-scanning operation,
a half-nut operatively connected to said unit and engageable with said feed screw during a sub-scanning operation,
means for at times disengaging said half-nut from said feed screw,
means responsive to the completion of said sub-scanning operation for actuating said disengaging means,
and means operatively connected with said disengaging means and effective when said half-nut is disengaged from said feed screw for applying a braking force to said unit while it is sliding downwardly along said sloped plane.

3. The combination of claim 1 which further includes:
a feed screw which is rotatable during said sub-scanning operation,
electromagnetic clutch means operatively connected to said unit and including a worm wheel engaging with said feed screw,
said clutch means controlling the coupling of the shaft of said worm wheel to said unit, whereby coupling of said shaft to said unit permits movement of said unit upwardly over said sloped plane in response to rotation of said feed screw while uncoupling of said shaft to said worm wheel permits said unit to move by gravity downwardly over said sloped plane,
and means effective during the downward movement of said unit to exert a braking force thereon.

References Cited

UNITED STATES PATENTS

| | | | |
|---|---|---|---|
| 1,929,485 | 10/1933 | Delchef | 178—69.5 X |
| 2,283,944 | 5/1942 | Parrott et al. | 178—14 |
| 3,280,251 | 10/1966 | Nakahara | 178—7.6 X |

JOSEPH W. HARTARY, Primary Examiner

U.S. Cl. X.R.

178—7.4